July 27, 1948.   G. E. H. HANSON   2,445,827

PICTURE SOUND RECORD PRODUCTION

Filed Oct. 23, 1945

INVENTOR.
GEORGE E. H. HANSON,
BY
ATTORNEY.

Patented July 27, 1948

2,445,827

UNITED STATES PATENT OFFICE 2,445,827

PICTURE SOUND RECORD PRODUCTION

George E. H. Hanson, Los Angeles, Calif., assignor to Radio Corporation of America, a corporation of Delaware Application October 23, 1945, Serial No. 623,967

5 Claims. (Cl. 88—16.2)

This invention relates to motion picture apparatus, and particularly to a recording and rerecording method of and system for producing a sound record for a motion picture made at a speed different from and, especially, less than present-day normal speed.

It is well-known that motion pictures today and during the past years have been photographed at twenty-four frames per second, which corresponds to a film speed of ninety feet per minute, and that the accompanying sound is recorded on a film advanced at the same speed so that the sound track may be later combined with the picture as a composite print. In the days of silent motion pictures, the film speed was sixteen frames per second, corresponding to sixty feet per minute. However, with the advent of sound on film, it was found that for quality sound recording and reproduction, particularly in the higher frequency range of the audio spectrum, a speed of ninety feet per minute was necessary.

The film industry today has many silent pictures in its libraries which are being reissued in both 35 mm. and 16 mm. forms. In the reissuing of these pictures, sound is added either as narrative dialogue or in the form of music or other background effects. The problem presents itself, therefore, of providing a sound track on the film which can be advanced at the picture speed of sixteen frames per second and provide sound quality comparable to sound tracks running at twenty-four frames per second. The present invention is directed to a solution of the problem which provides good quality sound tracks for 35 mm. and 16 mm. pictures being projected at sixteen frames per second.

The principal object of the invention, therefore, is to facilitate the recording and rerecording of a sound record for a picture to be projected at a speed different from present-day normal speed of twenty-four frames per second.

Another object of the invention is to provide an improved method of and means for adding a sound track to a picture photographed at sixteen frames per second.

A further object of the invention is to provide an improved method of and system for rerecording a sound track suitable for combining with a picture to be projected at less than twenty-four frames per second.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
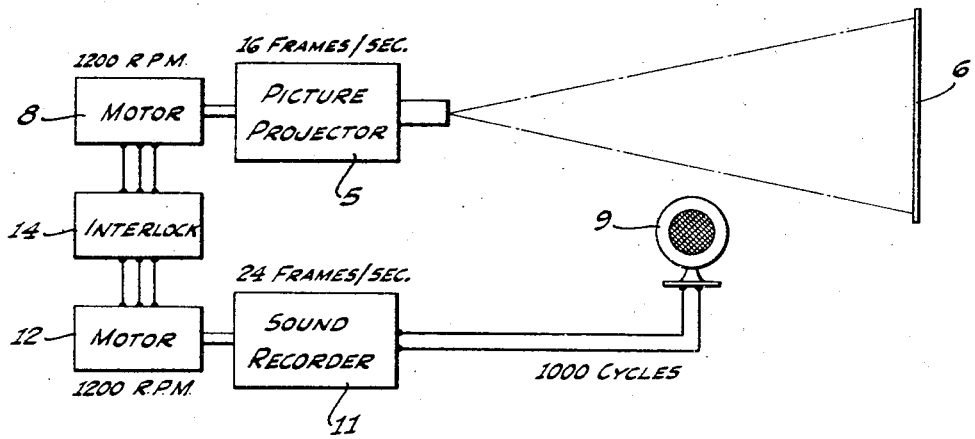
Fig. 1 is a diagrammatic view of a system for recording the original sound record to accompany the picture to be projected at less than present-day normal speed.

Referring now to Fig. 1, the original picture taken at a speed such as sixteen frames per second and which may be either of 35 or of 16 mm. width, is projected by a picture projector 5 to a screen 6. The picture projector is driven by a motor 8 which may have a speed of 1200 R. P. M. when the picture projector is advancing a film at the rate of sixteen frames per second. To provide a sound record for the picture in the form of narration, music, or sound effects, a microphone 9 is provided, the microphone being connected to a sound recorder 11 driven by a motor 12. The sound recorder may be a standard present-day type which will advance film at the rate of twenty-four frames per second when driven by a motor running at 1200 R. P. M. The motors 8 and 12 are interlocked through mechanism 14, as is well-known in the art, the films being advanced in synchronism at their relative speeds as indicated. As the picture is projected, the narration, music, or background effects are produced in accordance with the scene being shown, and these sounds are recorded in the normal present-day manner to provide a sound track to accompany the picture. For purposes of illustration, we can assume that a one thousand cycle note or tone is detected by the microphone 9 and recorded at the speed of twenty-four frames per second.

Figure 2:
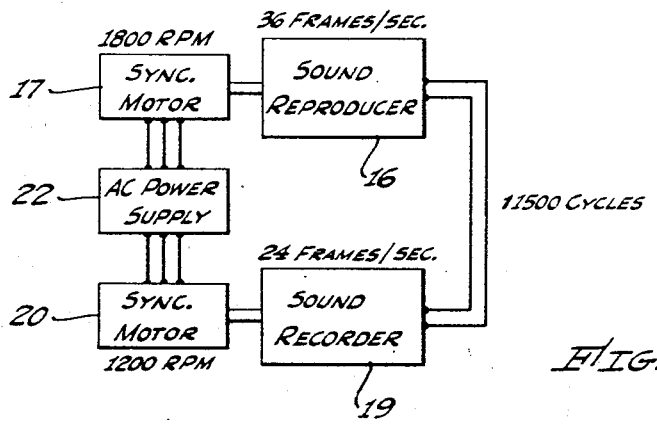
Fig. 2 is a schematic block diagram of a rerecording system in accordance with the invention.

Since the final sound track record is to run at only sixteen frames per second, a rerecording operation is performed as shown in Fig. 2. A standard sound reproducer 16 is driven at a speed of thirty-six frames per second by a synchronous motor 17 having a speed of 1800 R. P. M. At this increased speed above normal, the thousand cycle frequency in the output of sound reproducer 16 will now be 1500 cycles, this 1500 cycles being impressed on a standard sound recorder 19 advancing film at the normal speed of twenty-four frames per second by a synchronous motor 20 operating at 1200 R. P. M. The two synchronous motors 17 and 20 are driven from the same alternating current power supply 22 so as to maintain the proper synchronism between the ratio of advancement of the two films. It is realized that the frequencies on the record obtained from recorder 19 will be too high in pitch for normal reproduction at twenty-four frames per second. However, when this film is run at sixteen frames, or at one-third less speed, the 1500 cycles again becomes the original thousand cycles.

This rerecording operation, wherein the sound reproducer is run at a speed above normal, depending upon the difference between the original picture speed and a good recording speed, provides an extremely high quality sound track at 19, particularly in the high frequency region where quality deteriorates rapidly when film is advanced at slow speeds. The higher operating speed also provides more uniform film speed past the reproducing translation point, and thus improves quality. By increasing the speed of the reproducer reproducing the original record made at twenty-four frames per second to a speed where the ratio between the reproducing and recording speeds is the same as the ratio between the speed of the original recording speed and the picture speed, the sound track made on recorder 19 will be of the proper length for combination with the original picture.

Figure 3:
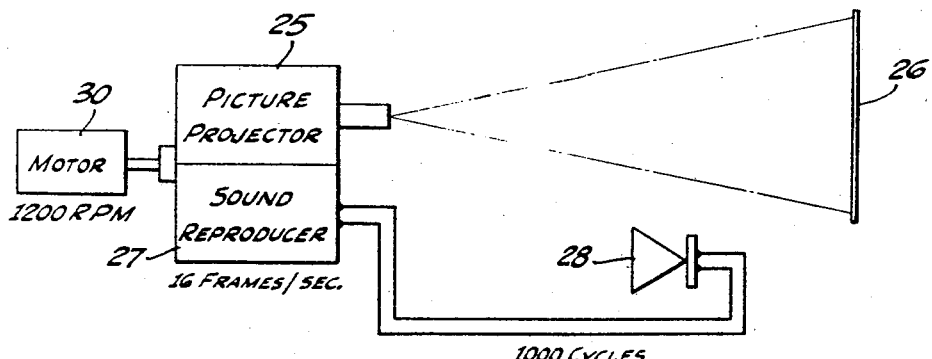
Fig. 3 is a schematic block diagram of the final reproducing system for a sound picture film made in accordance with the invention.

Now, when the sound track and picture are combined as a composite print, they are reproduced and projected as shown in Fig. 3. A picture projector portion 25 projects the picture to a screen 26 and a sound reproducing portion 27 reproduces the sound at a loud speaker 28, the motor for advancing the film through the projector and reproducer 30 having a speed of 1200 R. P. M. Since this method of producing the sound track provides a high quality record, the reproduction thereof at a reduced speed of sixty feet per minute does not prevent good reproduction. It is realized that the original silent picture may be a 35 mm. picture, and the final picture and sound track be reduced to 16 mm., or the final print may be on 35 mm. film. Also, the recorder 19 may be a 16 mm. recorder and the sound track directly combined with the 16 mm. picture operating at sixteen frames per second. If the original film is 16 mm., then a 16 mm. projector is used at 5 and the other operations will correspond to those described above.

Although definite speeds of 1200 and 1800 R. P. M. have been assigned to the motors for purposes of illustration, it is to be understood that the motors may have other speeds, depending upon the gearing employed. It is only necessary that the above-defined ratio exists and synchronism is maintained between the picture projector and recorder motors and between the reproducer and recorder motors of the rerecording operation.

I claim:

1. The method of producing a sound track for a previously made picture having a projection speed of sixteen frames per second, comprising projecting said picture at sixteen frames per second, recording a film sound record of the concomitant sound therefor at twenty-four frames per second, translating said sound record into electrical currents at thirty-six frames per second, rerecording a film record of said electrical currents at twenty-four frames per second, any definite length of said rerecorded sound film thereby corresponding to the same definite length of said original picture film and combining said last-mentioned rerecorded record with said original picture.

2. The method of producing a sound track to accompany a motion picture made at sixteen frames per second, comprising recording sound track for said picture on a film advanced at twenty-four frames per second, translating said sound track into electrical currents at thirty-six frames per second, rerecording a track of said electrical currents of sound on a film advanced at twenty-four frames per second, any definite length of said rerecorded sound film thereby corresponding to the same definite length of said original picture film and combining said last-mentioned rerecorded sound track with said original picture.

3. The method of producing a sound record for combination with a previously made picture, comprising recording a sound record for said picture at a speed higher than the normal speed of projection of said picture, translating said sound record into electrical currents and rerecording said record, said translating speed being higher than said rerecording speed by the same ratio as that between said original recording speed and said picture speed, so that any definite length of said rerecorded sound film thereby corresponds to the same definite length of said original picture film, and combining said rerecorded sound record with said original picture, said picture speed being sixteen frames per second, said recording and rerecording speed being twenty-four frames per second, and said translating speed being thirty-six frames per second.

4. A system for producing a concomitant sound track record for combination with a previously made picture, comprising a projector for projecting said picture at picture speed, a sound recorder synchronized with the projection of said picture, said recorder advancing said sound film at a speed higher than the speed that said picture film is advanced, a translator for translating said recorded sound track into corresponding electrical currents, a second recorder synchronized with said translator for recording said electrical currents, the speed of advancement of said film in said translator being higher than the speed of said second-mentioned recording by the same ratio as the speed of the first-mentioned recording is higher than the speed of picture projection, so that any definite length of said rerecorded sound film thereby corresponds to the same definite length of said original picture film, said picture projector advancing film at sixteen frames per second, said first-mentioned recorder advancing film at twenty-four frames per second, said translator advancing film at thirty-six frames per second, and said second-mentioned recorder advancing film at twenty-four frames per second.

5. A system for producing a sound track for a previously made silent picture adapted to be projected at sixteen frames per second, comprising a projector for projecting said picture film at sixteen frames per second, a recorder synchronized with said projector for recording concomitant sound for said picture on a film running at twenty-four frames per second, and a translator system for translating said concomitant sound record into electrical currents, said translator advancing said film at thirty-six frames per second and said recorder being synchronzied with said translator for recording said electrical currents at twenty-four frames per second so that any definite length of said rerecorded sound film thereby corresponds to the same definite length of said original picture film.

GEORGE E. H. HANSON.

REFERENCES CITED

The following references are of record in the file of this patent:

UNITED STATES PATENTS

| Number | Name | Date |
|---|---|---|
| 1,656,255 | Wente | Jan. 17, 1928 |
| 1,673,217 | Walker | June 12, 1928 |
| 1,716,033 | De Forest | June 4, 1929 |
| 1,771,940 | Robinson | July 29, 1930 |